United States Patent
Milum et al.

(10) Patent No.: US 9,364,822 B2
(45) Date of Patent: Jun. 14, 2016

(54) CATALYSTS FOR ELECTROLESS METALLIZATION CONTAINING FIVE-MEMBERED HETEROCYCLIC NITROGEN COMPOUNDS

(71) Applicant: Rohm and Haas Electronic Materials LLC, Marlborough, MA (US)

(72) Inventors: Kristen M. Milum, Boylston, MA (US); Donald E. Cleary, Littleton, MA (US); Maria Anna Rzeznik, Shrewsbury, MA (US)

(73) Assignee: Rohm and Haas Electronic Materials LLC

( * ) Notice: Subject to any disclaimer, the term of this patent is extended or adjusted under 35 U.S.C. 154(b) by 378 days.

(21) Appl. No.: 13/930,736

(22) Filed: Jun. 28, 2013

(65) Prior Publication Data

US 2015/0004323 A1    Jan. 1, 2015

(51) Int. Cl.
| | |
|---|---|
| C23C 18/18 | (2006.01) |
| B01J 31/18 | (2006.01) |
| C23C 18/20 | (2006.01) |
| C23C 18/30 | (2006.01) |
| B01J 31/28 | (2006.01) |
| C23C 18/32 | (2006.01) |
| C23C 18/38 | (2006.01) |
| B01J 31/22 | (2006.01) |
| B01J 31/02 | (2006.01) |
| C23C 18/16 | (2006.01) |

(52) U.S. Cl.
CPC .......... B01J 31/1805 (2013.01); B01J 31/2243 (2013.01); B01J 31/28 (2013.01); C23C 18/1837 (2013.01); C23C 18/1844 (2013.01); C23C 18/1886 (2013.01); C23C 18/2073 (2013.01); C23C 18/30 (2013.01); C23C 18/32 (2013.01); C23C 18/38 (2013.01); B01J 31/0247 (2013.01); B01J 2531/17 (2013.01); B01J 2531/824 (2013.01); B01J 2531/828 (2013.01); C23C 18/1653 (2013.01)

(58) Field of Classification Search
None
See application file for complete search history.

(56) References Cited

U.S. PATENT DOCUMENTS

| | | | |
|---|---|---|---|
| 4,248,632 | A | 2/1981 | Ehrich et al. |
| 4,966,786 | A | 10/1990 | Ehrich et al. |
| 5,112,513 | A | 5/1992 | Bressel et al. |
| 5,250,105 | A | 10/1993 | Gomes et al. |
| 5,503,877 | A | 4/1996 | Stamp et al. |
| 6,645,557 | B2 | 11/2003 | Joshi |
| 7,501,014 | B2 | 3/2009 | Poole et al. |

(Continued)

FOREIGN PATENT DOCUMENTS

| | | |
|---|---|---|
| DE | 1621207 | 6/1971 |
| DE | 1621207 A1 | 6/1971 |

(Continued)

OTHER PUBLICATIONS

Europe Search Report dated Mar. 11, 2014 corresponds with Europe Application No. 14174054, dated Mar. 11, 2014.

(Continued)

*Primary Examiner* — Shamim Ahmed
*Assistant Examiner* — Bradford Gates
(74) *Attorney, Agent, or Firm* — John J. Piskorski

(57) ABSTRACT

Catalysts include five-membered nitrogen containing heterocyclic compounds as ligands for metal ions which have catalytic activity. The catalysts are used to electrolessly plate metal on metal clad and un-clad substrates.

6 Claims, 3 Drawing Sheets

(56) References Cited

U.S. PATENT DOCUMENTS

| | | |
|---|---|---|
| 7,527,681 B2 | 5/2009 | Poole et al. |
| 7,611,569 B2 | 11/2009 | Poole et al. |
| 8,187,664 B2 | 5/2012 | Matsumoto et al. |
| 8,354,014 B2 | 1/2013 | Kohtoku et al. |
| 9,228,268 B2 | 1/2016 | Zhang-Berlinger et al. |
| 2004/0132300 A1 | 7/2004 | Konigshofen |
| 2004/0234777 A1 | 11/2004 | Grunwald |
| 2005/0175780 A1 | 8/2005 | Sparing et al. |
| 2009/0022885 A1* | 1/2009 | Matsumoto ............ H05K 3/182 427/98.5 |
| 2012/0067733 A1* | 3/2012 | Zhang-Beglinger ..... C25D 3/46 205/170 |
| 2012/0171363 A1 | 7/2012 | Yamamoto et al. |

FOREIGN PATENT DOCUMENTS

| | | |
|---|---|---|
| EP | 0619386 B1 | 10/1994 |
| EP | 1453988 B1 | 8/2004 |
| EP | 1942207 A1 | 9/2008 |
| GB | 1394165 | 3/1972 |
| GB | 1397091 A | 6/1975 |

OTHER PUBLICATIONS

Office Action and Search report from corresponding Taiwan 103122218 application, dated Jan. 11, 2016.

Search report from corresponding Chinese 201410427488.6 application, dated Mar. 1, 2016.

* cited by examiner

CATALYSTS FOR ELECTROLESS METALLIZATION CONTAINING FIVE-MEMBERED HETEROCYCLIC NITROGEN COMPOUNDS

FIELD OF THE INVENTION

The present invention is directed to catalysts for electroless metallization containing five-membered heterocyclcic nitrogen compounds. More specifically, the present invention is directed to catalysts for electroless metallization containing five-membered heterocyclic nitrogen compounds which are stable during storage and electroless metallization.

BACKGROUND OF THE INVENTION

Conventional printed circuit boards (PCBs) consist of laminated non-conductive dielectric substrates that rely on drilled and plated through holes (PTHs) to form a connection between the opposite sides and/or inner layers of a board. Electroless plating is a well-known process for preparing metallic coatings on surfaces. Electroless plating of a dielectric surface requires the prior deposition of a catalyst. The most commonly used method to catalyze or activate laminated non-conductive dielectric substrate regions, prior to electroless plating, is to treat the board with an aqueous tin-palladium colloid in an acidic chloride medium. The colloid consists of a metallic palladium core surrounded by a stabilizing layer of tin(II) ions. A shell of [SnCl$_3$]$^-$ complexes act as surface stabilizing groups to avoid agglomeration of colloids in suspension.

In the activation process, the palladium-based colloid is adsorbed onto an insulating substrate such as epoxy or polyimide to activate electroless copper deposition. Theoretically, for electroless metal deposition, the catalyst particles play roles as carriers in the path of transfer of electrons from reducing agent to metal ions in the plating bath. Although the performance of an electroless copper process is influenced by many factors such as composition of the deposition solution and choice of ligand, the activation step is the key factor for controlling the rate and mechanism of electroless deposition. Palladium/tin colloid has been commercially used as an activator for electroless metal deposition for decades, and its structure has been extensively studied. Yet, its sensitivity to air and high cost leave room for improvement or substitution.

While the colloidal palladium catalyst has given good service, it has many shortcomings which are becoming more and more pronounced as the quality of manufactured printed circuit boards increases. In recent years, along with the reduction in sizes and an increase in performance of electronic devices, the packaging density of electronic circuits has become higher and subsequently required to be defect free after electroless plating. As a result of greater demands on reliability alternative catalyst compositions are required. The stability of the colloidal palladium catalyst is also a concern. As mentioned above, the palladium/tin colloid is stabilized by a layer of tin(II) ions and its counter-ions can prevent palladium from aggregating. The tin(II) ions easily oxidizes to tin(IV) and thus the colloid cannot maintain its colloidal structure. This oxidation is promoted by increases in temperature and agitation. If the tin(II) concentration is allowed to fall close to zero, then palladium particles can grow in size, agglomerate, and precipitate.

Considerable efforts have been made to find new and better catalysts. For example, because of the high cost of palladium, much of the effort has been directed toward the development of a non-palladium or bimetallic alternative catalyst. In the past, problems have included the fact that they are not sufficiently active or reliable enough for through-hole plating. Furthermore, these catalysts typically become progressively less active upon standing, and this change in activity renders such catalysts unreliable and impractical for commercial use. Accordingly, there is still a need for a replacement catalyst for palladium/tin.

SUMMARY OF THE INVENTION

Methods include providing a catalyst comprising complexes of metal ions and one or more compounds having formula:

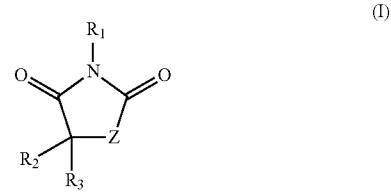

where $R_1$ may be hydrogen, substituted or unsubstituted, linear or branched (C$_1$-C$_6$)alkyl, hydroxyl, ester or (C$_1$-C$_4$)alkoxy; $R_2$ and $R_3$ may be the same or different and may be hydrogen, substituted or unsubstituted, linear or branched (C$_1$-C$_4$)alkyl, hydroxyl, ester, (C$_1$-C$_4$)alkoxy or ureido; and Z is either

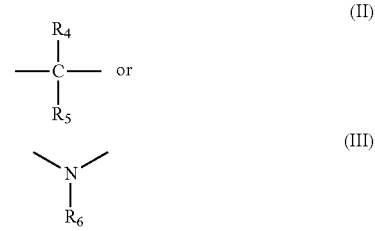

where $R_4$ and $R_5$ may be the same or different and may be hydrogen, linear or branched, substituted or unsubstituted (C$_1$-C$_4$)alkyl, hydroxyl or (C$_1$-C$_4$)alkoxy; and $R_6$ may be hydrogen, substituted or unsubstituted, linear or branched (C$_1$-C$_6$)alkyl, hydroxyl, ester or (C$_1$-C$_4$)alkoxy; applying the catalyst to a substrate; applying a reducing agent to the catalyst; and immersing the substrate into a metal plating bath to electrolessly plate metal on the substrate.

Catalysts consist essentially of metal ions and one or more compounds having formula:

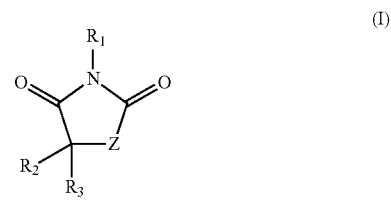

where $R_1$ may be hydrogen, substituted or unsubstituted, linear or branched (C$_1$-C$_6$)alkyl, hydroxyl, ester or (C$_1$-C$_4$)alkoxy; $R_2$ and $R_3$ may be the same or different and may be hydrogen, substituted or unsubstituted, linear or branched $(C_1-C_4)$alkyl, hydroxyl, ester $(C_1-C_4)$alkoxy or ureido; and Z is either

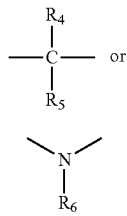

where $R_4$ and $R_5$ may be the same or different and may be hydrogen, linear or branched, substituted or unsubstituted $(C_1-C_4)$alkyl, hydroxyl or $(C_1-C_4)$alkoxy; and $R_6$ may be hydrogen, substituted or unsubstituted, linear or branched $(C_1-C_6)$alkyl, hydroxyl, ester or $(C_1-C_4)$alkoxy.

The catalysts may be used to electrolessly plate metals on substrates, including substrates of dielectric materials and are stable upon storage as well as during electroless metal plating since they do not readily oxidize as compared to conventional tin/palladium catalysts. They do not require strong acids to prepare or maintain stability, thus they are less corrosive than conventional catalysts. They do not require tin compounds for stability and may be halogen free as halogens may be corrosive. The catalysts enable good metal coverage during via and through-hole filling in the manufacture of printed circuit boards and semiconductor wafers.

DETAILED DESCRIPTION OF THE INVENTION

Figure 1:
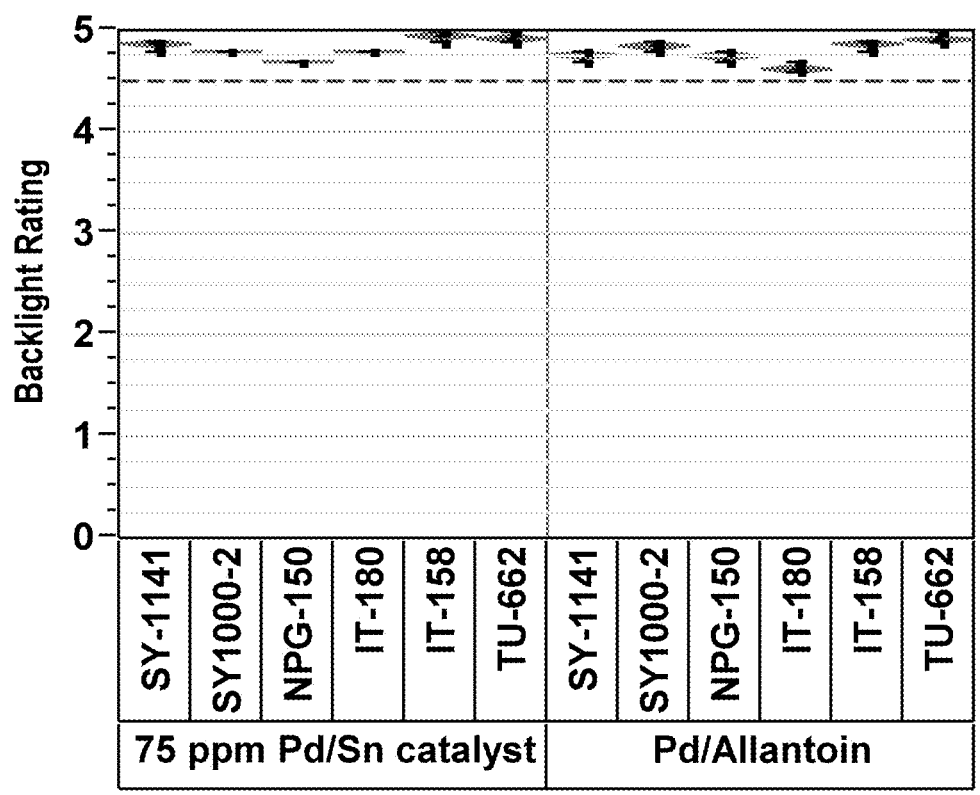
FIG. 1 is a Backlight Rating of a palladium/allantoin catalyst vs. a conventional palladium/tin catalyst for multiple substrates.

As used throughout this specification, the abbreviations given below have the following meanings, unless the context clearly indicates otherwise: g=gram; mg=milligram; mL=milliliter; L=liter; cm=centimeter; m=meter; mm=millimeter; μm=micron; ppm=parts per million; °C.=degrees Centigrade; g/L=grams per liter; DI=deionized; Pd=palladium; wt %=percent by weight; and $T_g$=glass transition temperature.

The terms "printed circuit board" and "printed wiring board" are used interchangeably throughout this specification. The terms "plating" and "deposition" are used interchangeably throughout this specification. All amounts are percent by weight, unless otherwise noted. All numerical ranges are inclusive and combinable in any order except where it is logical that such numerical ranges are constrained to add up to 100%.

Aqueous catalyst solutions include complexes of metal ions chosen from silver, gold, platinum, palladium, copper, cobalt and nickel, and one or more complexing compounds having formula:

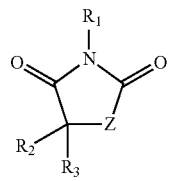

where $R_1$ may be hydrogen, substituted or unsubstituted, linear or branched $(C_1-C_6)$alkyl, hydroxyl, ester or $(C_1-C_4)$alkoxy; $R_2$ and $R_3$ may be the same or different and may be hydrogen, substituted or unsubstituted, linear or branched $(C_1-C_4)$alkyl, hydroxyl, ester $(C_1-C_4)$alkoxy or ureido; and Z is either

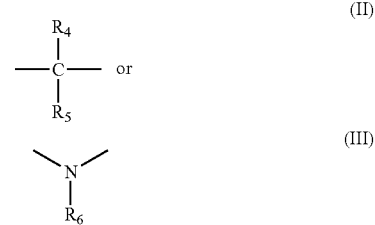

where the carbon of (II) and the nitrogen of (III) are covalently bonded to adjacent carbons of (I) and where $R_4$ and $R_5$ may be the same or different and may be hydrogen, linear or branched, substituted or unsubstituted $(C_1-C_4)$alkyl, hydroxyl or $(C_1-C_4)$alkoxy; and $R_6$ may be hydrogen, substituted or unsubstituted, linear or branched $(C_1-C_6)$alkyl, hydroxyl, ester or $(C_1-C_4)$alkoxy. Substituent groups include, but are not limited to hydroxyl, halogen such as chloride, bromide, fluoride and iodide, amine, amide, alkoxy such as methoxy and ethoxy. Such five-membered heterocyclic nitrogen compounds may be included in amounts of 25 ppm to 1000 ppm, or such as from 30 ppm to 500 ppm.

Preferably $R_1$ is hydrogen, substituted or unsubstituted, linear or branched $(C_1-C_4)$alkyl, hydroxyl or $(C_1-C_4)$alkoxy, more preferably, $R_1$ is hydrogen, substituted or unsubstituted, linear or branched $(C_1-C_4)$alkyl. $R_2$ and $R_3$ are preferably hydrogen, ureido, substituted, unsubstituted, linear or branched $(C_1-C_4)$alkyl or hydroxyl, more preferably, $R_2$ and $R_3$ are hydrogen, ureido or substituted or unsubstituted $(C_1-C_2)$alkyl, with the proviso that when $R_2$ or $R_3$ is ureido the other is hydrogen. Preferably $R_4$ and $R_5$ are hydrogen or substituted or unsubstituted $(C_1-C_2)$alkyl. Preferably $R_6$ is hydrogen or substituted or unsubstituted $(C_1-C_2)$alkyl. Preferred substituent groups include hydroxyl, amine and chloride. Preferably Z is structure (III).

Examples of such five-membered heterocyclic nitrogen compounds are hydantoin, 1-methylhydantoin, 1,3-dimethylhydantoin, 5,5-dimethylhydantoin, allantoin, 1,3-dihydroxymethyl-5,5-dimethylhydantoin and succinimide.

Sources of metal ions include any of the conventional water soluble metal salts known in the art and literature which provide metals having catalytic activity. One type of catalytic metal ion may be used or mixtures of two or more catalytic metal ions may be used. Such salts are included to provide metal ions in amounts of 20 ppm to 350 ppm, preferably from 25 ppm to 250 ppm. Silver salts include, but are not limited to, silver nitrate, silver acetate, silver trifluoroacetate, silver tosylate, silver triflate, silver fluoride, silver oxide, silver sodium thiosulfate and silver potassium cyanide. Palladium salts include, but are not limited to, palladium chloride, palladium acetate, palladium potassium chloride, palladium sodium chloride, sodium tetrachloropalladate and palladium nitrate. Gold salts include, but are not limited to gold cyanide, gold trichloride, gold tribromide, potassium gold chloride, potassium gold cyanide, sodium gold chloride and sodium gold cyanide. Platinum salts include, but are not limited to, platinum chloride and platinum sulfate. Copper salts include, but are not limited to, copper sulfate and copper chloride. Nickel salts include, but are not limited to nickel chloride and nickel sulfate. Cobalt salts include, but are not limited to, cobalt acetate, cobalt chloride, cobalt bromide and cobalt ammonium sulfate. Preferably the metal ions are silver, palladium and gold ions. More preferably the metal ions are silver and palladium. Most preferably the ions are palladium.

The components which make up the aqueous catalysts may be combined in any order. Any suitable method known in the art and literature may be used to prepare the aqueous catalysts. The amount of five-membered heterocyclic nitrogen complexing compounds and one or more metal ions included in the aqueous catalyst solutions are such that a molar ratio of complexing compounds to metal ions is from 1:1 to 4:1, preferably from 1:1 to 2:1. In general, one or more of the complexing compounds is first solubilized in a sufficient amount of water. One or more sources of metal ions are dissolved in a minimal amount of water and then combined with the complexing solution with stirring to form a uniform aqueous solution. Typically the catalyst solution is prepared at room temperature but some heating may be required to expedite solubilization of the components. The pH of the as-synthesized catalyst may range from acidic to alkaline. Typically the pH range is from 2 to 11. Typically the acidic range is from 2 to 6 and the alkaline range is from 8 to 11. Inorganic or organic acids or salts thereof may be used in sufficient amounts to maintain the pH at the desired range. Mixtures of inorganic and organic acids and their salts also may be used. Inorganic acids include but are not limited to hydrochloric acid, sulfuric acid, boric acid, phosphoric acid and nitric acid. Organic acids include but are not limited to mono- and polycarboxylic acids, such as dicarboxylic acids. Examples of organic acids are benzoic acid, ascorbic acid, iso-ascorbic acid, malic acid, maleic acid, oxalic acid, acetic acid, citric acid and tartaric acid.

Following application of the catalyst to the substrate and prior to metallization one or more reducing agents are applied to the catalyzed substrate to reduce the metal ions to their metallic state. Conventional reducing agents known to reduce metal ions to metal may be used. Such reducing agents include, but are not limited to dimethylamine borane, sodium borohydride, ascorbic acid, iso-ascorbic acid, sodium hypophosphite, hydrazine hydrate, formic acid and formaldehyde. Preferably the reducing agent is chosen from sodium hypophosphite. Reducing agents are included in amounts to reduce substantially all of the metal ions to metal. Such amounts are generally conventional amounts and are well known by those of skill in the art.

The catalysts may be used to electrolessly metal plate various substrates. Such substrates include, but are not limited to materials including inorganic and organic substances such as glass, ceramics, porcelain, resins, paper, cloth, combinations thereof and semiconductors. Metal-clad and unclad materials also are substrates which may be metal plated using the catalyst.

Substrates also include printed circuit boards. Such printed circuit boards include metal-clad and unclad with thermosetting resins, thermoplastic resins and combinations thereof, including fiber, such as fiberglass, and impregnated embodiments of the foregoing.

Thermoplastic resins include, but are not limited to, acetal resins, acrylics, such as methyl acrylate, cellulosic resins, such as ethyl acetate, cellulose propionate, cellulose acetate butyrate and cellulose nitrate, polyethers, nylon, polyethylene, polystyrene, styrene blends, such as acrylonitrile styrene and copolymers and acrylonitrile-butadiene styrene copolymers, polycarbonates, polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to, allyl phthalate, furane, melamine-formaldehyde, phenol-formaldehyde and phenol-furfural copolymers, alone or compounded with butadiene acrylonitrile copolymers or acrylonitrile-butadiene-styrene copolymers, polyacrylic esters, silicones, urea formaldehydes, epoxy resins, allyl resins, glyceryl phthalates and polyesters.

Porous materials include, but are not limited to paper, wood, fiberglass, cloth and fibers, such as natural and synthetic fibers, such as cotton fibers and polyester fibers.

The catalysts may be used to plate both low and high $T_g$ resins. Low $T_g$ resins have a $T_g$ below 160° C. and high $T_g$ resins have a $T_g$ of 160° C. and above. Typically high $T_g$ resins have a $T_g$ of 160° C. to 280° C. or such as from 170° C. to 240° C. High $T_g$ polymer resins include, but are not limited to, polytetrafluoroethylene (PTFE) and polytetrafluoroethylene blends. Such blends include, for example, PTFE with polypheneylene oxides and cyanate esters. Other classes of polymer resins which include resins with a high Tg include, but are not limited to, epoxy resins, such as difunctional and multifunctional epoxy resins, bimaleimide/triazine and epoxy resins (BT epoxy), epoxy/polyphenylene oxide resins, acrylonitrile butadienestyrene, polycarbonates (PC), polyphenylene oxides (PPO), polyphenylene ethers (PPE), polyphenylene sulfides (PPS), polysulfones (PS), polyamides, polyesters such as polyethyleneterephthalate (PET) and polybutyleneterephthalate (PBT), polyetherketones (PEEK), liquid crystal polymers, polyurethanes, polyetherimides, epoxies and composites thereof.

The catalysts may be used to deposit metals on the walls of through-holes or vias of printed circuit boards. The catalysts may be used in both horizontal and vertical processes of manufacturing printed circuit boards.

The aqueous catalysts may be used with conventional electroless metal plating baths. While it is envisioned that the catalysts may be used to electrolessly deposit any metal which may be electrolessly plated, typically, the metal is chosen from copper, copper alloys, nickel or nickel alloys. More typically the metal is chosen from copper and copper alloys, most typically copper is used. An example of a commercially available electroless copper plating bath is CIRCUPOSIT™ 880 Electroless Copper bath (available from Dow Advanced Materials, Marlborough, Mass.).

Typically sources of copper ions include, but are not limited to water soluble halides, nitrates, acetates, sulfates and other organic and inorganic salts of copper. Mixtures of one or more of such copper salts may be used to provide copper ions. Examples include copper sulfate, such as copper sulfate pentahydrate, copper chloride, copper nitrate, copper hydroxide and copper sulfamate. Conventional amounts of copper salts may be used in the compositions. In general copper ion concentrations in the composition may range from 0.5 g/L to 30 g/L.

One or more alloying metals also may be included in the electroless compositions. Such alloying metals include, but are not limited to nickel and tin. Examples of copper alloys include copper/nickel and copper/tin. Typically the copper alloy is copper/nickel.

Sources of nickel ions for nickel and nickel alloy electroless baths may include one or more conventional water soluble salts of nickel. Sources of nickel ions include, but are not limited to, nickel sulfates and nickel halides. Sources of nickel ions may be included in the electroless alloying compositions in conventional amounts. Typically sources of nickel ions are included in amounts of 0.5 g/L to 10 g/L.

The method steps used in metalizing a substrate may vary depending on whether the surface to be plated is metal or dielectric. Specific steps and sequence of steps may also vary from one method to the next. Conventional steps used for electrolessly metal plating a substrate may be used with the catalysts; however, the aqueous catalysts do not require an acceleration step where tin is stripped to expose the palladium metal for electroless plating as in many conventional processes. Accordingly, acceleration steps are excluded when using the catalysts. Preferably, the catalysts are applied to the surface of the substrate to be electrolessly plated with a metal followed by application of a reducing agent to the catalyzed substrate and then application of the metal plating bath. Electroless metal plating parameters, such as temperature and time may be conventional. Conventional substrate preparation methods, such as cleaning or degreasing the substrate surface, roughening or micro-roughening the surface, etching or micro-etching the surface, solvent swell applications, desmearing through-holes and various rinse and anti-tarnish treatments may be used. Such methods and formulations are well known in the art and disclosed in the literature.

Typically, when the substrate to be metal plated is a dielectric material such as on the surface of a printed circuit board or on the walls of through-holes, the boards are rinsed with water and cleaned and degreased followed by desmearing the through-hole walls. Typically prepping or softening the dielectric surface or desmearing of the through-holes begins with application of a solvent swell.

Any conventional solvent swell may be used. The specific type may vary depending on the type of dielectric material. Examples of dielectrics are disclosed above. Minor experimentation may be done to determine which solvent swell is suitable for a particular dielectric material. The $T_g$ of the dielectric often determines the type of solvent swell to be used. Solvent swells include, but are not limited to glycol ethers and their associated ether acetates. Conventional amounts of glycol ethers and their associated ether acetates may be used. Examples of commercially available solvent swells are CIRCUPOSIT™ Conditioner 3302, CIRCUPOSIT™ Hole Prep 3303 and CIRCUPOSIT™ Hole Prep 4120 (available from Dow Advanced Materials).

After the solvent swell, a promoter may be applied. Conventional promoters may be used. Such promoters include sulfuric acid, chromic acid, alkaline permanganate or plasma etching. Typically alkaline permanganate is used as the promoter. Examples of commercially available promoters are CIRCUPOSIT™ Promoter 4130 and CIRCUPOSIT™ MLB Promoter 3308 (available from Dow Advanced Materials). Optionally, the substrate and through-holes are rinsed with water.

A neutralizer is then applied to neutralize any residues left by the promoter. Conventional neutralizers may be used. Typically the neutralizer is an aqueous acidic solution containing one or more amines or a solution of 3 wt % hydrogen peroxide and 3 wt % sulfuric acid. An example of a commercially available neutralizer is CIRCUPOSIT™ MLB Neutralizer 216-5. Optionally, the substrate and through-holes are rinsed with water and then dried.

After neutralizing an acid or alkaline conditioner may be applied. Conventional conditioners may be used. Such conditioners may include one or more cationic surfactants, non-ionic surfactants, complexing agents and pH adjusters or buffers. Examples of commercially available acid conditioners are CIRCUPOSIT™ Conditioners 3320 and 3327 (available from Dow Advanced Materials). Suitable alkaline conditioners include, but are not limited to, aqueous alkaline surfactant solutions containing one or more quaternary amines and polyamines. Examples of commercially available alkaline surfactants are CIRCUPOSIT™ Conditioner 231, 3325, 813 and 860. Optionally, the substrate and through-holes are rinsed with water.

Conditioning may be followed by micro-etching. Conventional micro-etching compositions may be used. Micro-etching is designed to provide a micro-roughened metal surface on exposed metal (e.g. innerlayers and surface etch) to enhance subsequent adhesion of plated electroless metal and later electroplate. Micro-etches include, but are not limited to, 60 g/L to 120 g/L sodium persulfate or sodium or potassium oxymonopersulfate and sulfuric acid (2%) mixture, or generic sulfuric acid/hydrogen peroxide. Examples of commercially available micro-etching compositions are CIRCUPOSIT™ Microetch 3330 Etch solution and PREPOSIT™ 748 Etch solution both available from Dow Advanced Materials. Optionally, the substrate is rinsed with water.

Optionally, a pre-dip may then applied to the micro-etched substrate and through-holes. Examples of pre-dips include organic salts such as sodium potassium tartrate or sodium citrate, 0.5% to 3% sulfuric acid or an acidic solution of 25 g/L to 75 g/L sodium chloride.

The aqueous catalyst is then applied to the substrate. Application may be done by any conventional method used in the art, such as immersing the substrate in a solution of the catalyst or by spraying or by atomization using conventional apparatus. Catalyst dwell time may range from 1 minute to 10 minutes, typically from 2 minutes to 8 minutes for vertical equipment and for 25 seconds to 120 seconds for horizontal equipment. The catalysts may be applied at temperatures from room temperature to 80° C., typically from 30° C. to 60° C. The substrate and through-holes optionally may be rinsed with water after application of the catalyst.

The reducing solution is then applied to the substrate to reduce the metal ions of the catalyst to their metallic state. The reducing solution may be applied by immersing the substrate into the reducing solution, spraying the reducing solution onto the substrate or by applying the solution by atomization. The temperature of the solution may range from room temperature to 65° C., typically from 30° C. to 55° C. Contact time between the reducing solution and the catalyzed substrate may range from 30 seconds to 5 minutes before application of the electroless metal plating bath.

The substrate and walls of the through-holes are then electrolessly plated with metal, such as copper, copper alloy, nickel or nickel alloy using an electroless bath. Typically copper is plated on the walls of the through-holes. Plating times and temperatures may be conventional. Typically metal deposition is done at temperatures of 20° C. to 80°, more typically from 30° C. to 60° C. The substrate may be immersed in the electroless plating bath or the electroless bath may be sprayed onto the substrate. Typically, electroless plating may be done for 5 seconds to 30 minutes; however, plating times may vary depending on the thickness of the metal desired.

Optionally anti-tarnish may be applied to the metal. Conventional anti-tarnish compositions may be used. An example of anti-tarnish is ANTI TARNISH™ 7130 (available from Dow Advanced Materials). The substrate may optionally be rinsed with water and then the boards may be dried.

Further processing may include conventional processing by photoimaging and further metal deposition on the substrates such as electrolytic metal deposition of, for example, copper, copper alloys, tin and tin alloys.

The catalysts may be used to electrolessly plate metals on various substrates, including substrates of dielectric materials and are stable upon storage as well as during electroless metal plating since they do not readily oxidize as compared to conventional tin/palladium catalysts. They do not require strong acids to prepare or maintain stability thus they are less corrosive than conventional catalysts. They do not require tin compounds for stability and may be halogen free. The ionic catalysts enable good metal coverage during via and through-hole filling in the manufacture of printed circuit boards.

The following examples are not intended to limit the scope of the invention but to further illustrate it.

EXAMPLE 1

A catalyst containing 75 ppm palladium ions and 220 ppm allantoin in one liter of water was prepared by diluting a 4.4 mL aliquat of a 50 g/L allantoin stock solution with 900 mL of DI water. 208 mg of sodium tetrachloropalladate was dissolved in a minimum of DI water and added to the allantoin solution. The mixture was then diluted to one liter and stirred 30 minutes at room temperature. The molar ratio of allantoin to palladium ions was 2:1. The pH of the solution was 3.4.

A second catalyst was prepared containing 75 ppm palladium ions and 180 ppm 5,5-dimethylhydantoin in one liter of water to make a stock solution of 50 g/L. A 3.6 mL aliquat of the 50 g/L 5,5-dimethylhydantoin stock solution was diluted with 900 mL of DI water. 188 mg of palladium nitrate dihydrate was dissolved in a minimum of DI water and added to the 5,5-dimethylhydantoin solution. The mixture was then diluted to one liter and stirred 30 minutes at room temperature. The molar ratio of 5,5-dimethylhydantoin to palladium ions was 2:1. The pH of the solution was adjusted to 8.5 using 1M sodium hydroxide.

Each catalyst was then used to electrolessly plate NY-1140 un-clad laminates (available from NanYa) according to the method as follows:
1. Each un-clad laminate was immersed in CIRCUPOSIT™ Conditioner 3325 solution at 50° C. for 5 minutes then rinsed with flowing tap water for 4 minutes;
2. The laminates were then immersed in PREPOSIT™ 748 Etch solution at room temperature for 1 minute and then rinsed with flowing DI water rinse for 4 minutes;
3. Each laminate was immersed into a solution of either the palladium ions and allantoin catalyst or the palladium ions and 5,5-dimethylhydantoin catalyst for 5 minutes at 40° C. followed by rinsing for 1 minute with flowing DI water;
4. The laminates were then immersed into a 0.25M sodium hypophosphite solution at 50° C. for 1 minute to reduce the palladium ions to palladium metal and then rinsed with flowing DI water for 1 minute;
5. The activated laminates were immersed in CIRCUPOSIT™ 880 Electroless Copper bath at 40° C. and a pH of 13 for 15 minutes to plate copper on the laminates;
6. After copper plating the laminates were rinsed with flowing tap water for 4 minutes.

Each laminate was examined for copper plating performance. Both laminates appeared to have a shinny and uniform copper deposit.

EXAMPLE 2

The method of Example 1 is repeated except that a catalyst containing 70 ppm of silver ions from silver nitrate and 102 ppm of allantoin, and 70 ppm or silver ions from silver nitrate and 83 ppm of 5,5-dimethylhydantoin are made. The catalyst is prepared by substantially the same process as described in Example 1. The molar ratio of the complexing agents to the silver ions is 1:1. The pH of each catalyst solution is 3. NY-1140 un-clad laminates are prepared for electroless copper plating as described in Example 1. After plating the laminates are examined for the quality of the copper deposits. Both laminates are expected to have smooth and shinny copper deposits.

EXAMPLE 3

Two each of six different copper-clad panels with a plurality of through-holes were provided: TUC-662, SY-1141, SY-1000-2, IT-158, IT-180 and NPG-150. TUC-662 was obtained from Taiwan Union Technology, and SY-1141 and SY-1000-2 were obtained from Shengyi. IT-158 and IT-180 were obtained from ITEQ Corp. and NPG-150 was obtained from NanYa. The $T_g$ values of the panels ranged from 140° C. to 180° C. Each panel was 5 cm×12 cm.

A 75 ppm palladium ions/220 ppm allantoin catalyst was prepared. At room temperature 4.4 mL of an allantoin solution from a 50 g/L stock solution at pH 10 was diluted in 900 mL of DI water. 208 mg of sodium terachloropalladate was dissolved in a minimal amount of DI water and added to the allantoin solution. Sufficient DI water was added to the solution with stirring to bring it to one liter. The molar ratio of allantoin to palladium ions in the catalyst was 2:1. The pH was 3.4 with no adjustments made.

The through-holes of each panel were treated as follows:
1. The through-holes of each panel were desmeared with CIRCUPOSIT™ MLB Conditioner 211 solution for 7 minutes at 80° C.;
2. The through-holes of each panel were then rinsed with flowing tap water for 4 minutes;
3. The through-holes were then treated with CIRCUPOSIT™ MLB Promoter 3308 aqueous permanganate solution at 80° C. for 10 minutes;
4. The through-holes were then rinsed for 4 minutes in flowing tap water;
5. The through-holes were then treated with a 3 wt % sulfuric acid/3 wt % hydrogen peroxide neutralizer at room temperature for 2 minutes;
6. The through-holes of each panel were then rinsed with flowing tap water for 4 minutes;
7. The through-holes of each panel were then treated with CIRCUPOSIT™ Conditioner 3325 alkaline solution for 5 minutes at 50° C.;
8. The through-holes were then rinsed with flowing tap water for 4 minutes;
9. The through-holes were then treated with PREPOST™ 748 Etch solution for 2 minutes at room temperature for 6 of the panels and 1 minute for the other 6;
10. The through-holes of each panel were then rinsed with flowing DI water for 4 minutes;
11. The through-holes of the panels which were etched for 2 minutes were then immersed in CATAPREP™ 404 Pre-Dip solution at room temperature for 1 minute followed by immersing the panels in a solution of a conventional palladium/tin catalyst having 75 ppm of palladium metal with an excess of tin for 5 minutes at 40° C.; while the panels which were etched for 1 minute were immersed in the palladium ions/allantoin catalyst described above for 5 minutes at 40° C.;

12. The panels which were treated with the catalyst containing palladium ions and allantoin were then immersed in a 0.25M solution of sodium hypophosphite reducing agent at 50° C. for 1 minute to reduce the palladium ions to palladium metal;
13. All of the panels were then rinsed with flowing DI water for 4 minutes;
14. The panels were then immersed in CIRCUPOSIT™ 880 Electroless Copper plating bath at 40° C. and at a pH of 13 and copper was deposited on the walls of the through-holes for 15 minutes;
15. The copper plated panels were then rinsed with cold water for 4 minutes;
16. Each copper plated panel was then dried with compressed air; and
17. The walls of the through-holes of the panels were examined for copper plating coverage using the backlight process described below.

Each panel was cross-sectioned nearest to the centers of the through-holes as possible to expose the copper plated walls. The cross-sections, no more than 3 mm thick from the center of the through-holes, were taken from each panel to determine the through-hole wall coverage. The European Backlight Grading Scale was used. The cross-sections from each panel were placed under a conventional optical microscope of 50× magnification with a light source behind the samples. The quality of the copper deposits was determined by the amount of light visible under the microscope that was transmitted through the sample. Transmitted light was only visible in areas of the plated through-holes where there was incomplete electroless coverage. If no light was transmitted and the section appeared completely black, it was rated a 5 on the backlight scale indicating complete copper coverage of the through-hole wall. If light passed through the entire section without any dark areas, this indicated that there was very little to no copper metal deposition on the walls and the section was rated 0. If sections had some dark regions as well as light regions, they were rated between 0 and 5. A minimum of ten through-holes were inspected and rated for each board.

FIG. 1 is a backlight rating distribution graph showing the backlight performance of both catalysts for each of the six types of panels plated. The plots in the graph indicate a 95% confidence interval for the backlight ratings of ten through-holes sectioned for each board. The horizontal line through the middle of each plot indicates the average backlight value for each group of ten through-hole sections measured. The palladium/allantoin catalyst performed substantially the same as the conventional palladium/tin colloidal catalyst with backlight values of greater than 4.5. Backlight values of 4.5 and greater are indicative of commercially acceptable catalysts in the plating industry.

EXAMPLE 4

The method of Example 3 was repeated using the same panels except that the catalyst solution contained 75 ppm of palladium ions and 180 ppm of dimethylhydantoin. 360 mg of dimethylhydantoin were dissolved in 1900 mL of DI water and the pH of the solution was adjusted to 10.2 with 1M sodium hydroxide. 375 mg of palladium nitrate hydrate was dissolve in a minimal of DI water and added to the solution containing the complexing agent. The solution was then diluted to 2 liters while stirring at room temperature for 30 minutes. The pH of the final solution was 8.5. The molar ratio of the complexing agent to the palladium ions was 2:1.

The through-holes of each panel were treated as follows:
1. The through-holes of each panel were desmeared with CIRCUPOSIT™ MLB Conditioner 211 solution for 7 minutes at 80° C.;
2. The through-holes of each panel were then rinsed with flowing tap water for 4 minutes;
3. The through-holes were then treated with CIRCUPOSIT™ MLB Promoter 3308 aqueous permanganate solution at 80° C. for 10 minutes;
4. The through-holes were then rinsed for 4 minutes in flowing tap water;
5. The through-holes were then treated with a 3 wt % sulfuric acid/3 wt % hydrogen peroxide neutralizer at room temperature for 2 minutes;
6. The through-holes of each panel were then rinsed with flowing tap water for 4 minutes;
7. The through-holes of each panel were then treated with CIRCUPOSIT™ Conditioner 3325 alkaline solution for 5 minutes at 50° C.;
8. The through-holes were then rinsed with flowing tap water for 4 minutes;
9. The through-holes were then treated with 1% sulfuric acid and 75 g/L sodium persulfate etch for 2 minutes at room temperature;
10. The through-holes of each panel were then rinsed with flowing DI water for 4 minutes;
11. The through-holes of ½ of the panels were then immersed in CATAPREP™ 404 Pre-Dip at room temperature for 1 minute followed by immersing the panels in a conventional solution of palladium metal/tin catalyst having 75 ppm of palladium metal with an excess of tin for 5 minutes at 40° C.; while the other ½ of the panels were immersed in the palladium ions/dimethylhydantoin catalyst for 5 minutes at 40° C.;
12. The panels which were treated with the catalyst containing palladium ions and dimethylhydantoin were then immersed in a 0.25M solution of sodium hypophosphite reducing agent at 50° C. for 1 minute to reduce the palladium ions to palladium metal;
13. The panels catalyzed with the palladium/tin catalyst were then rinsed with flowing DI water for 4 minutes and the panels catalyzed with the palladium/diemthylhydantoin catalyst were rinsed for 30 seconds;
14. The panels were then immersed in CIRCUPOSIT™ 880 Electroless Copper plating bath at 38° C. and at a pH of 13 and copper was deposited on the walls of the through-holes for 15 minutes;
15. The copper plated panels were then rinsed with cold water for 4 minutes;
16. Each copper plated panel was then dried with compressed air; and
17. The walls of the through-holes of the panels were examined for copper plating coverage using the backlight process as described in Example 3 above.

Figure 2:
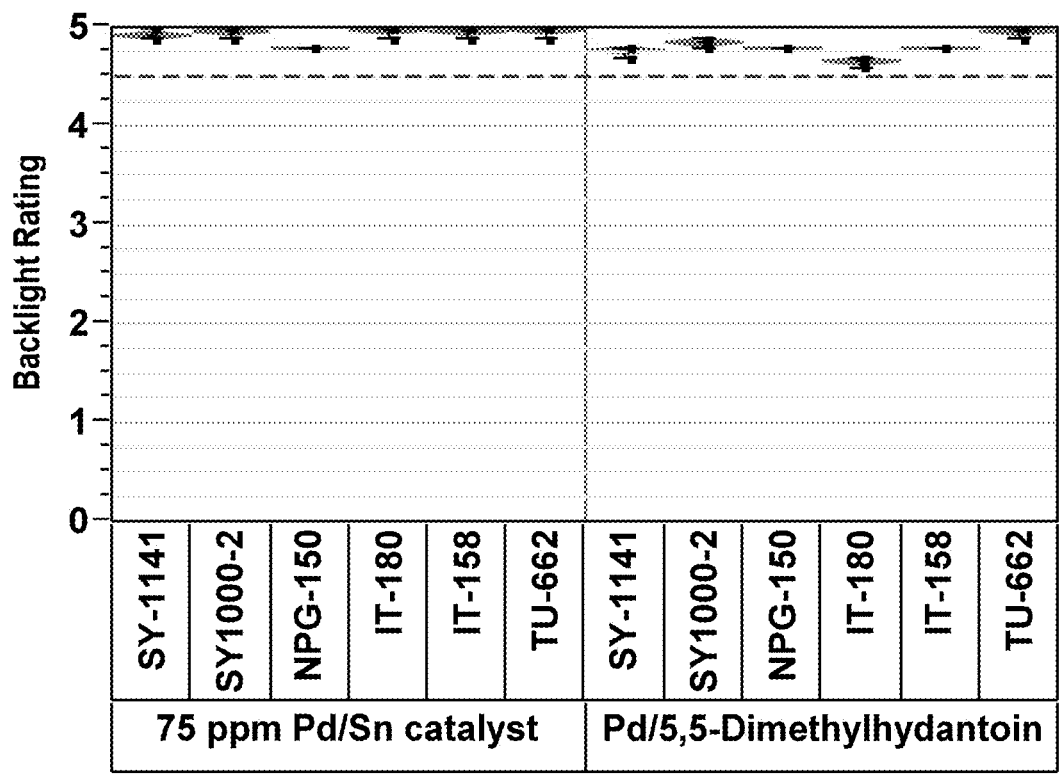
FIG. 2 is a Backlight Rating of a palladium/dimethylhydantoin catalyst vs. a conventional palladium/tin catalyst for multiple substrates.

FIG. 2 is a backlight rating distribution graph showing the backlight performance of both catalysts for each of the six types of panels plated. The plots in the graph indicate a 95% confidence interval for the backlight ratings of ten through-holes sectioned for each board. The horizontal line through the middle of each plot indicates the average backlight value for each group of ten through-hole sections measured. Although the palladiums/dimethylhydantoin catalyst did not perform as well as the conventional palladium/tin colloidal catalyst, the palladium/dimethyhydantoin catalyst had backlight values of greater than 4.5 which are acceptable for commercial purposes.

EXAMPLE 5

The method of Example 3 was repeated using the same panels except that the catalyst solution contained 75 ppm of palladium ions and 140 ppm of succinimide. 0.24 g of succinimide was dissolved in 400 mL of DI water. The solution was adjusted to a pH of 10.5 with 1M sodium hydroxuide. 375 mg of palladium nitrate hydrate was dissolved in a minimal amount of DI water and added to the succinimide solution. The solution of the palladium ions and succinimide was then added to a one liter solution containing 1 g trisodium potassium citrate and 3.8 g of sodium tetraborate decahydrate. This solution was stirred for 30 minutes at room temperature. The molar ratio of the complexing agent to the palladium ions was 2:1 and the pH of the solution was 9.

The through-holes of each panel were treated as follows:
1. The through-holes of each panel were desmeared with CIRCUPOSIT™ MLB Conditioner 211 solution for 7 minutes at 80° C.;
2. The through-holes of each panel were then rinsed with flowing tap water for 4 minutes;
3. The through-holes were then treated with CIRCUPOSIT™ MLB Promoter 3308 aqueous permanganate solution at 80° C. for 10 minutes;
4. The through-holes were then rinsed for 4 minutes in flowing tap water;
5. The through-holes were then treated with a 3 wt % sulfuric acid/3 wt % hydrogen peroxide neutralizer at room temperature for 2 minutes;
6. The through-holes of each panel were then rinsed with flowing tap water for 4 minutes;
7. The through-holes of each panel were then treated with CIRCUPOSIT™ Conditioner 3325 alkaline solution for 5 minutes at 50° C.;
8. The through-holes were then rinsed with flowing tap water for 4 minutes;
9. The through-holes were then treated with 1% sulfuric acid and 75 g/L sodium persulfate etch for 2 minutes at room temperature;
10. The through-holes of each panel were then rinsed with flowing DI water for 4 minutes;
11. The through-holes of ½ of the panels were then immersed in CATAPREP™ 404 Pre-Dip solution at room temperature for 1 minute followed by immersing the panels in a solution of a conventional palladium/tin catalyst having 75 ppm of palladium with an excess of tin for 5 minutes at 40° C.; while the other ½ of the panels were first immersed in a pre-dip containing 0.5 g/L trisodium citrate at room temperature for 1 minute and then immersed in the palladium ions/succinimide catalyst for 5 minutes at 40° C.;
12. The panels which were treated with the catalyst containing palladium ions and succinimide were then immersed in a 0.25M solution of sodium hypophosphite reducing agent at 50° C. for 1 minute to reduce the palladium ions to palladium metal;
13. The panels catalyzed with the palladium/tin catalyst were then rinsed with flowing DI water for 4 minutes and the panels catalyzed with the palladium/succinimide catalyst rinsed for 30 seconds;
14. The panels were then immersed in CIRCUPOSIT™ 880 Electroless Copper plating bath at 38° C. and at a pH of 13 and copper was deposited on the walls of the through-holes for 15 minutes;
15. The copper plated panels were then rinsed with cold water for 4 minutes;
16. Each copper plated panels was then dried with compressed air; and
17. The walls of the through-holes of the panels were examined for copper plating coverage using the backlight process as described in Example 3 above.

Figure 3:
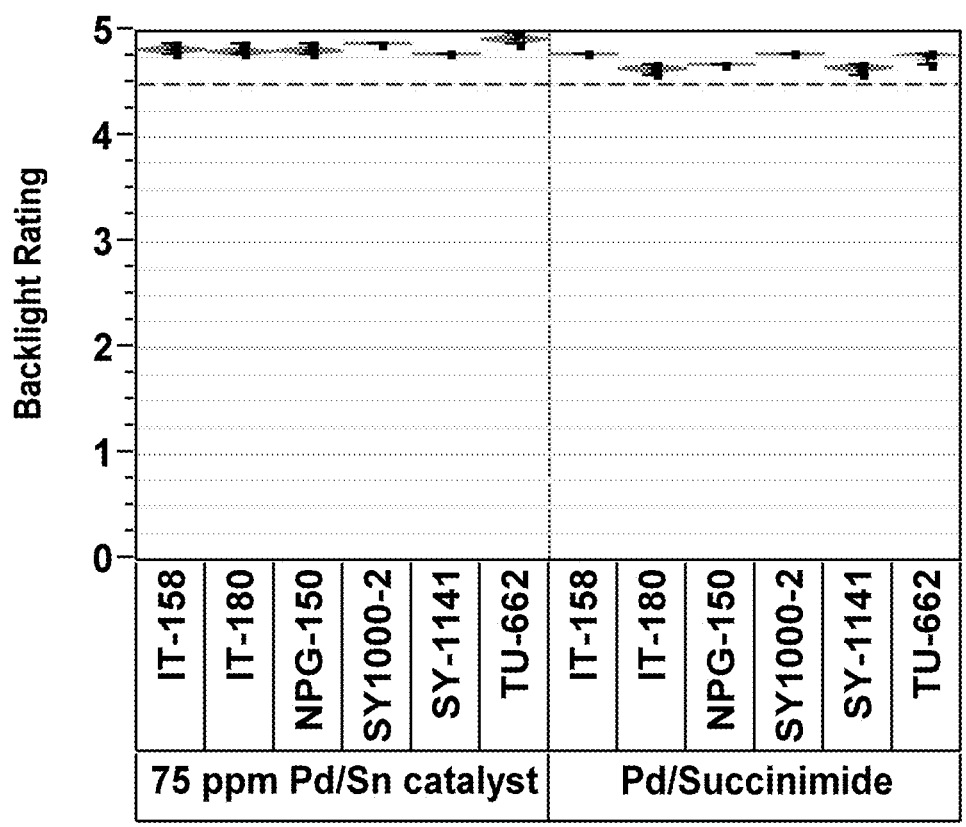
FIG. 3 is a Backlight Rating of a palladium/succinimide catalyst vs. a conventional palladium/tin catalyst for multiple substrates.

FIG. 3 is a backlight rating distribution graph showing the backlight performance of both catalysts for each of the six types of panels plated. The plots in the graph indicate a 95% confidence interval for the backlight ratings of ten through-holes sectioned for each board. The horizontal line through the middle of each plot indicates the average backlight value for each group of ten through-hole sections measured. Although the palladium/succinimide catalyst did not perform as well as the conventional palladium/tin colloidal catalyst, the palladium/succinimide catalyst had backlight values of greater than 4.5 which are acceptable for commercial purposes.

EXAMPLE 6

The method of Example 4 is repeated except that a silver ion and 5,5-dimethylhydantoin catalyst is used to activate six panels. 150 ppm of silver from silver acetate and 208 ppm of hydantoin are included in the catalyst. The catalyst is prepared by substantially the same process as described in Example 4. The molar ratio of hydantoin to silver ions is 1.5:1. The procedure and parameters are substantially the same as in Example 3 above. The back light results are expected to be substantially the same as shown in the FIG. 2 for the palladium and 5,5 dimethylhydantoin catalyst.

EXAMPLE 7

The method of Example 5 is repeated except that gold ions and succinimide and platinum and sucinimide are used to make the catalysts. The gold ions are provided by potassium gold chloride and the platinum ions are provided by potassium tetrachloroplatinate. The catalysts are prepared by substantially the same method as described in Example 5. The gold and succinimide catalyst contain 60 ppm of gold ions and 60 ppm of succinimide. The platinum and succinimide catalyst contain 80 ppm of platinum ions and 82 ppm of succinimide. The molar ratios of the succinimide to metal ions are 2:1. The procedure and parameters are substantially the same as in Example 5 above. The back light results are expected to be substantially the same as shown in the FIG. 3 for the palladium and succinimide catalyst with backlight values of 4.5 or greater.

EXAMPLE 8

The method of Example 3 is repeated except that ionic catalysts of copper and allantoin, cobalt and 5,5-dimethylhydantoin and nickel and succinimide are prepared. The method of preparation of the catalysts is substantially the same as in Example 1. The copper ions and allantoin catalyst contains 100 ppm of copper ions from copper sulfate pentahydrate and 498 ppm of allantoin. The cobalt ions and 5,5-dimethylhydantoin catalyst contains 110 ppm of cobalt ions from cobalt acetate and 477 ppm 5,5-dimethylhydantoin, and the nickel succinimide ionic catalyst contains 120 ppm of nickel ions from nickel chloride and 403 ppm of succinimide. The molar ratios of the complexing agents to the metal ions are 2:1. The procedure and parameters are substantially the same as in Example 3 above. The back light results are expected to be 4.5 or greater.

What is claimed is:

1. A method comprising:
a) providing a catalyst comprising complexes of metal ions and one or more compounds having formula:

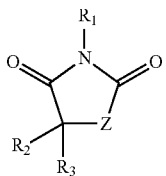

wherein $R_1$ may be hydrogen, substituted or unsubstituted, linear or branched $(C_1-C_6)$alkyl, hydroxyl, ester or $(C_1-C_4)$alkoxy; $R_2$ and $R_3$ may be the same or different and may be hydrogen, substituted or unsubstituted, linear or branched $(C_1-C_4)$alkyl, hydroxyl, ester $(C_1-C_4)$alkoxy or ureido; and Z is either

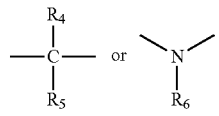

wherein $R_4$ and $R_5$ may be the same or different and may be hydrogen, linear or branched, substituted or unsubstituted $(C_1-C_4)$alkyl, hydroxyl or $(C_1-C_4)$alkoxy; and $R_6$ may be hydrogen, substituted or unsubstituted, linear or branched $(C_1-C_6)$alkyl, hydroxyl, ester or $(C_1-C_4)$alkoxy;

b) applying the catalyst to a substrate;

c) applying a reducing agent to the catalyst; and d) immersing the substrate with the catalyst into a metal plating bath to electrolessly plate metal on the substrate.

2. The method of claim 1, wherein the one or more compounds are chosen from hydantoin, 1-methylhydantoin, 1,3-dimethylhydantoin, 5,5-dimethylhydantoin, allantoin, 1,3-dihydroxymethyl-5,5-dimethylhydantoin and succinimide.

3. The method of claim 1, wherein a molar ratio of the one or more compounds to the metal ions is 1:1 to 4:1.

4. The method of claim 1, wherein the metal ions are chosen from palladium, silver, gold, platinum, copper, nickel and cobalt.

5. The method of claim 1, wherein the metal of the metal plating bath is chosen from copper, copper alloy, nickel and nickel alloy.

6. The method of claim 1, wherein the one or more compounds are in amounts of 25 ppm to 1000 ppm.

* * * * *